United States Patent
Kim et al.

(10) Patent No.: US 9,672,425 B2
(45) Date of Patent: Jun. 6, 2017

(54) METHOD AND APPARATUS FOR DETECTING OBJECT OF IMAGE

(71) Applicant: SAMSUNG ELECTRONICS CO., LTD., Suwon-si (KR)

(72) Inventors: Kyoung-Young Kim, Suwon-si (KR); Hee-chul Han, Hwaseong-si (KR); Hyun-seok Hong, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 14/572,204

(22) Filed: Dec. 16, 2014

(65) Prior Publication Data

US 2015/0169957 A1    Jun. 18, 2015

(30) Foreign Application Priority Data

Dec. 16, 2013  (KR) .......................... 10-2013-0156650

(51) Int. Cl.
*G06K 9/00*    (2006.01)

(52) U.S. Cl.
CPC ............................. *G06K 9/00664* (2013.01)

(58) Field of Classification Search
CPC .................. G06K 9/00624; G06K 9/00664
See application file for complete search history.

(56) References Cited

U.S. PATENT DOCUMENTS

| | | | |
|---|---|---|---|
| 3,700,801 A | 10/1972 | Dougherty | |
| 6,459,824 B1* | 10/2002 | Lee | G06F 17/30259 345/420 |
| 2005/0225566 A1* | 10/2005 | Kojo | G06T 13/80 345/629 |
| 2012/0303343 A1* | 11/2012 | Sugiyama | G06N 3/006 703/6 |
| 2013/0250050 A1* | 9/2013 | Kanaujia | H04N 13/0007 348/42 |

* cited by examiner

*Primary Examiner* — Tom Y Lu
(74) *Attorney, Agent, or Firm* — Sughrue Mion, PLLC

(57) ABSTRACT

A method and apparatus for detecting an object is provided. The method includes recognizing a predetermined object from at least one of an image and a video and determining a position of the recognized object, displaying on the image or the video a location of a predetermined part of the recognized object, rearranging the displayed location of the predetermined part of the recognized object based on an input signal, and renewing the position of the recognized object based on a result of the rearranging of the displayed location of the predetermined part of the recognized object.

18 Claims, 8 Drawing Sheets

METHOD AND APPARATUS FOR DETECTING OBJECT OF IMAGE

CROSS-REFERENCE TO RELATED APPLICATION(S)

This application claims priority from Korean Patent Application No. 10-2013-0156650, filed on Dec. 16, 2013, in the Korean Intellectual Property Office, the disclosure of which is incorporated herein in its entirety by reference.

BACKGROUND

1. Field

Apparatuses and methods consistent with exemplary embodiments relate to a method of and an apparatus for detecting an object in an image.

2. Description of Related Art

With the development of a multimedia technology, various image processing techniques have emerged. For example, a technology of obtaining various information from an image has been introduced. However, it can be difficult to edit information obtained from an image in the related art.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments include a method and an apparatus for editing information that is obtained from at least one of an image and a video. The apparatus may provide a function that enables a user to easily edit information that is associated with an object included in the image.

Additional aspects will be set forth in part in the description which follows, and in part, will be apparent from the description, or may be learned by practice of one or more of the exemplary embodiments.

According to an aspect of an exemplary embodiment, there is provided a method of detecting an object including recognizing a predetermined object from at least one of an image and a video and determining a position of the recognized object; displaying on the image or the video a location of a predetermined part of the recognized object; rearranging the displayed location of the predetermined part of the recognized object based on a user input; and renewing the position of the recognized object based on a result of the rearranging of the displayed location of the predetermined part of the recognized object.

The rearranging of the displayed location may include displaying a plurality of predicted positions of the object, receiving a user input selecting one of the plurality of predicted positions, and rearranging the displayed location of the recognized object based on the selection input.

The predetermined object may include a human, and the predetermined part may include at least one of a head, a hand, a foot, a wrist, an ankle, a knee, and a shoulder.

The determining of the position may include analyzing renewal history information with respect to the position of the recognized object, and determining the position of the recognized object using a result of the analyzing.

The displaying of the plurality of predicted positions may be performed using information about the user and information about at least one of the image and a video.

The information about the user may include at least one of a current location of the user, a hobby of the user, and the current weather.

The information about at least one of the image and the video may include a location of an object when the image or the video is generated, the weather when the image or the video is generated, and a human recognized in the image or the video.

The displaying of the location of the predetermined part of the recognized object may include displaying the location of the predetermined part as a certain figure based on the selected predicted position.

The rearranging of the displayed location based on the input signal may include receiving a user input of a new location of the predetermined part of the recognized object with respect to the displayed location of the recognized object.

BRIEF DESCRIPTION OF THE DRAWINGS

These and/or other aspects will become apparent and more readily appreciated from the following description of one or more of the exemplary embodiments, taken in conjunction with the accompanying drawings, in which.

DETAILED DESCRIPTION

Figure 1:
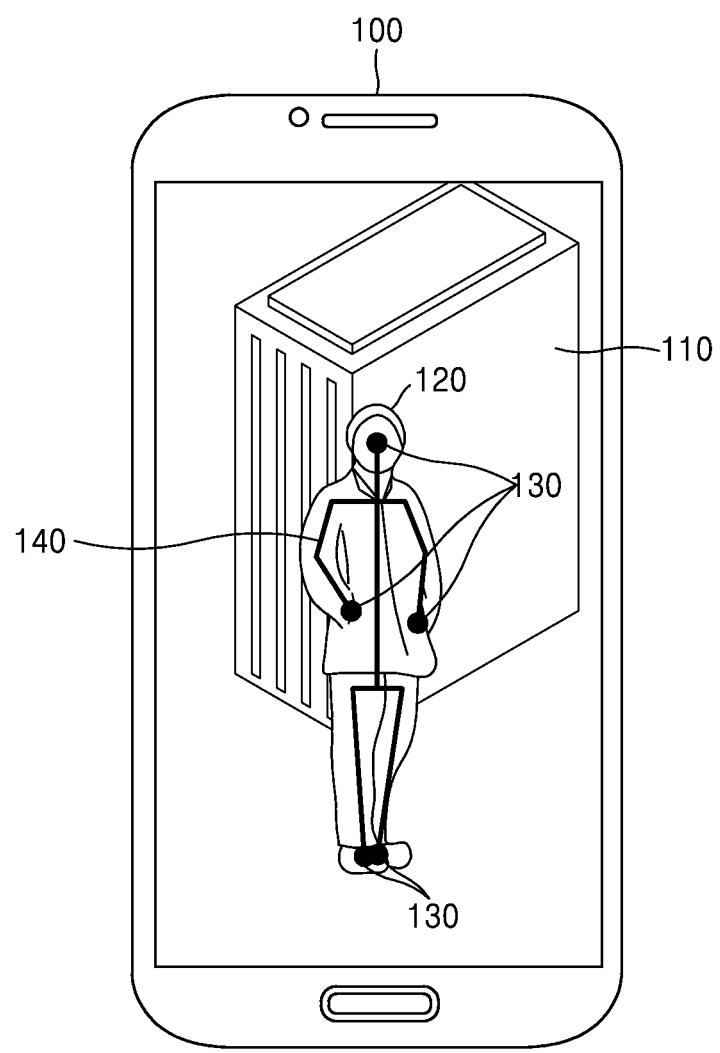
FIG. 1 is a diagram illustrating determining a position of an object recognized from an image and editing the determined position, according to an exemplary embodiment.

Hereinafter, exemplary embodiments are described. It should also be appreciated that one or more of the exemplary embodiments claimed herein are not limited thereto. Furthermore, specific features described herein may be used in combination with other features in various possible combinations and replacements.

It will be understood that, although various features of the invention have been described with respect to one or more of the exemplary embodiments, the various features and embodiments may be combined or used in conjunction with other features and exemplary embodiments as described and illustrated herein.

It will be understood that, although terms such as first, second, and the like, may be used herein to describe various elements, these elements should not be limited by these terms. These terms are only used to distinguish one element from another.

As used herein, the singular forms "a," "an," and "the" are intended to include the plural forms as well, unless the context clearly indicates otherwise.

The exemplary embodiments are illustrated in the accompanying drawings, wherein like reference numerals refer to the like elements throughout. In this regard, one or more of the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed. Expressions such as "at least one of," when preceding a list of elements, modify the entire list of elements and do not modify the individual elements of the list.

According to one or more exemplary embodiments, an image may include a video that is visually identifiable. Accordingly, an image as described in one or more exemplary embodiments may include not only a still picture but also a visual screen or content shown in the video.

FIG. 1 is a diagram illustrating determining a position of an object recognized from an image and editing the determined position, according to an exemplary embodiment.

Referring to FIG. 1, device 100 may recognize object 120 from an image 110, for example, a predetermined object. Also, the device 100 may determine a position of the recognized object 120. For example, the device 100 may be or may be included in a display apparatus, a television, a camera, a computer, a mobile phone, a tablet, an appliance, and the like.

The device 100 may display a location of a part of the recognized object 120 on the image 110, for example, a predetermined part of the recognized object. A symbol 130 such as a predetermined symbol may be displayed on the location of the predetermined part. Also, the device 100 may display the position of the recognized object 120 using a visual symbol 140, such as a line. In this example, the predetermined part includes the face and the hands of a person.

In addition, the device 100 may rearrange the location on which the predetermined symbol 130 is to be displayed based on a user input. For example, if the device 100 rearranges the location on which the predetermined symbol 130 is to be displayed, a way of displaying the visual symbol 140 for expressing the position may be re-determined.

Figure 2:
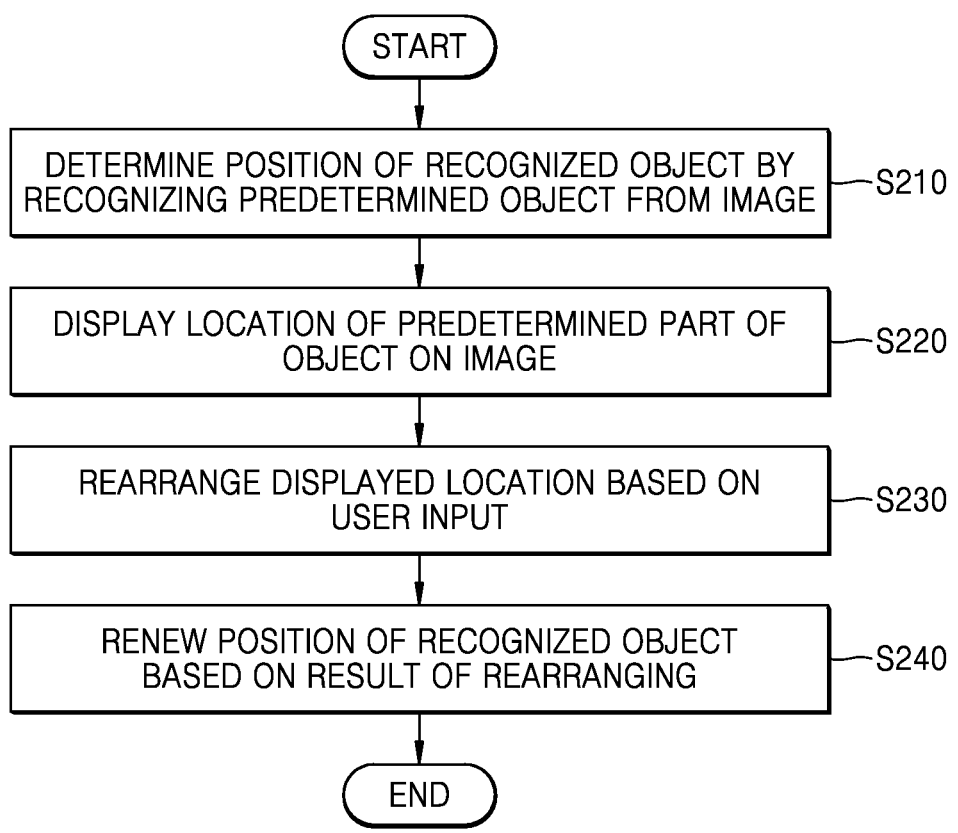
FIG. 2 is a flowchart illustrating a method of determining a position of an object recognized from an image and renewing the position of the object by editing the determined position, according to an exemplary embodiment.

FIG. 2 is a flowchart illustrating a method of determining a position of an object recognized from an image and renewing the position of the object by editing the determined position, according to an exemplary embodiment.

Referring to FIG. 2, the device 100 recognizes a predetermined object from an image and determines the position of the recognized object, in operation S210.

For example, the device 100 may extract a still picture at a point in time from a video to recognize the predetermined object from the image, in operation S210. The still picture extracted by the device 100 may be selected based on a user input.

As a non-limiting example, the predetermined object may include a human, an animal, and the like. The device 100 may determine whether there is a predetermined object in the image. For example, the device 100 may determine whether there is a figure corresponding to the predetermined object within the image, to determine whether the predetermined object is present in the image. In an example in which the predetermined object is a human, the device 100 may determine whether there is a human figure in the image. Also, when determining that there is a human figure in the image, the device 100 may recognize the human figure.

When the device 100 recognizes the predetermined object in the image, the device 100 may determine a position of the recognized object.

For example, if the predetermined object is a human, the device 100 may determine a position of the human in the image by determining a location of a head, a hand, a foot, and a like, of the human.

Alternatively, the device 100 may determine a figure of the recognized object and determine a position of the recognized object based on the determined figure.

The device 100 may have data about various predicted positions stored therein to more accurately determine a position of the predetermined object. The device 100 may determine the position of the object in such a way that the device 100 recognizes a new or a current position each time that the device 100 determines the position of the object. Alternatively, the device 100 may determine the position of the object in such a way that the device 100 selects the most similar position among previously stored positions of the object as the determined position of the object.

The device 100 may use information about a user or information about the image when determining the position of the recognized object. For example, the information about the user may include a hobby, an occupation, and a place or location frequently visited by the user. For example, if the hobby of the user is golf, the position of the recognized object may be determined in consideration of the fact that the user may be holding a golf club.

Also, the information about the user may include at least one of a location of the user, the weather, and the like. For example, the location information of the user may include information of a current location of the user.

The information about the image may include at least one of a location of an object when the image is generated, the weather when the image is generated, a human recognized in the image, and the like.

The device 100 displays a location of a predetermined part of the object on the image, in operation S220. For example, if the predetermined object is a human or an animal, the predetermined part of the object may include a body part such as at least one of a head, a hand, a foot, a wrist, an ankle, a knee, a shoulder, and the like, of the human or the animal. Alternatively, the predetermined part may include one or more bodily joints, and the like.

When the device 100 displays the location of the predetermined part of the object on the image, the device 100 may use the predetermined symbol 130. For example, the predetermined symbol 130 may include a symbol in the shape of at least one of a point, a circle, a polygon, an ellipse, a square, or any other shape or symbol.

When displaying the location of the predetermined part of the object on the image, the device 100 may display the predetermined symbol 130 such that the predetermined symbol 130 overlaps a portion of the image and blocks or otherwise covers a portion of the image. Alternatively, when displaying the location of the predetermined part of the object on the image, the device 100 may display the predetermined symbol 130 to be partially transparent or half-transparent while overlapping the image.

Alternatively, the device 100 may be set such that the device 100 may display the location of the predetermined part of the object only after receiving a certain input. For example, the device 100 may be set such that the location of the predetermined part of the object may be displayed on the image after receiving an input that requests or otherwise permits the displaying of the location of the predetermined part of the object being applied to the device 100.

In addition, the device 100 may display the position of the recognized object using the visual symbol 140, which in this example is a line. The visual symbol 140 may be displayed such that a plurality of the predetermined symbols 130 are connected to one another by the visual symbol 140. As an example, the visual symbol 140 may be a broken line, an unbroken line, an arrangement of dashes or dots, and the like.

The device 100 rearranges the location displayed in operation S220 based on a user input, in operation S230.

Alternatively, the device 100 may rearrange a location of a symbol displayed in operation S220, based on a user input. The symbol may include at least one of the predetermined symbol 130, and the visual symbol 140.

For example, the device 100 may operate such that the user may drag one of the symbols 130 displayed in operation S220 and move the symbol 130 to another place. In this example, a visual symbol 140, as well as the predetermined symbol 130, may be rearranged based on the user input.

In addition, the user input for causing the device 100 to rearrange the location displayed in operation S220 may be an input of selecting one of a plurality of positions. Examples of an input for selecting one of a plurality of positions are described later in FIG. 3

The device 100 renews the position of the object recognized in operation S210 based on the rearrangement of operation S230, in operation S240.

When the location of the predetermined symbol 130 and/or the visual symbol 140 are changed in operation S230, the device 100 may renew the position of the object recognized in operation S210 based on the change. For example, the device 100 may newly determine the position of the object recognized in operation S210 based on the change of location that occurs in operation S230. Also, when the newly determined position is different from that of the previously determined position, the device 100 may determine that the position of the object recognized in operation S210 has a new position.

According to one or more exemplary embodiments, during the renewing of the position of at least one of the recognized object 120, symbol 130, and visual symbol 140, the device 100 may update, refresh, replace, change, or the like, a location of the position of at least one of the recognized object 120, symbol 130, and visual symbol 140.

For example, the position of the object may first be recognized as a position in which the object (i.e. human) puts their hand in a pocket. In this example, it may later be determined that the position of the object is that of a position of taking pictures, as a result of the rearrangement determined in operation S230. Accordingly, in operation S240 the device 100 may renew the position of the recognized object as the position of taking pictures.

Figure 3:
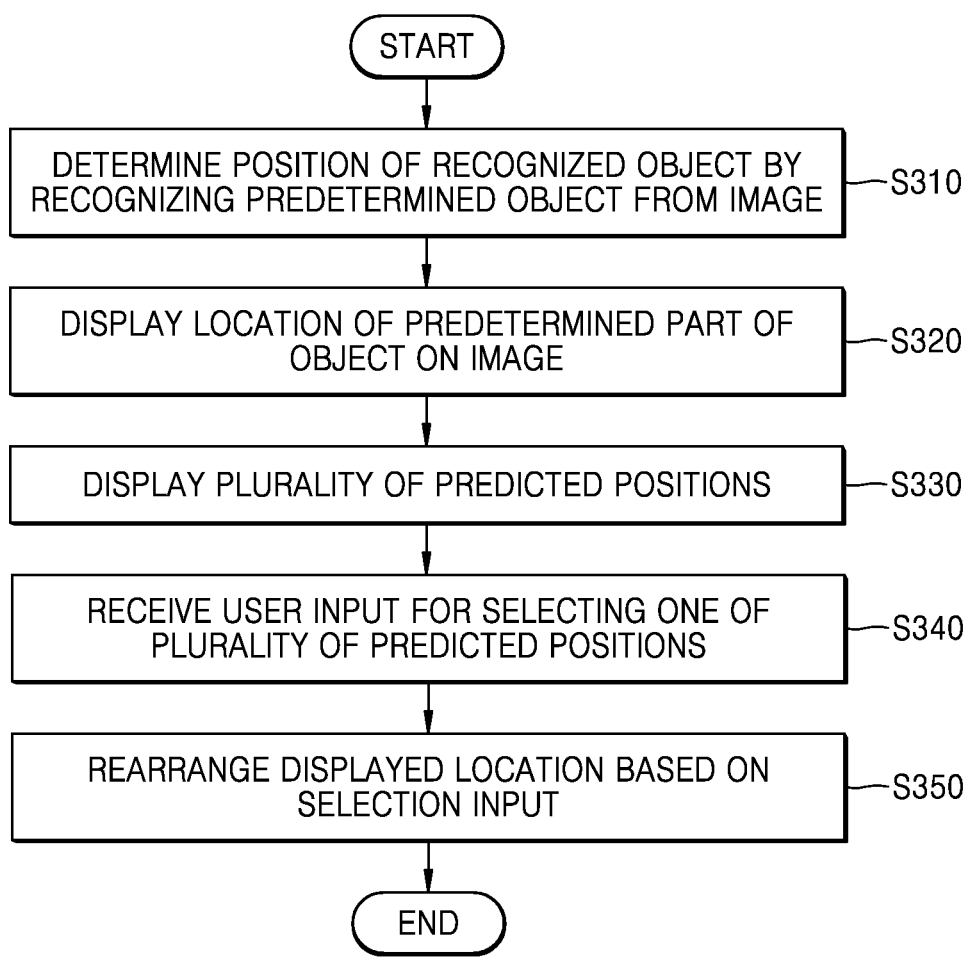
FIG. 3 is a flowchart illustrating a method of renewing a position of an object by receiving an input for selecting one from among a plurality of predicted positions, according to an exemplary embodiment.

FIG. 3 is a flowchart illustrating a method of receiving an input for selecting one of a plurality of predicted positions and renewing a position of an object, according to an exemplary embodiment.

In this example, because operations S310 and S320 respectively correspond to the operations S210 and S220 of FIG. 2, their detailed descriptions are omitted for brevity of explanation.

Referring to FIG. 3, device 100 displays a plurality of predicted positions, in operation S330. The device 100 may previously store the plurality of predicted positions. For example, the device 100 may select and display at least one of the plurality of predicted positions previously stored in the device 100 based on a position of the object determined in operation S310.

The above descriptions will be referred to for aspects with respect to a method in which the device 100 determines the position of the object in operation S310.

According to one or more exemplary embodiments, the device 100 may use information about a user or information about an image when displaying the plurality of predicted positions. For example, the information about the user may include a hobby, an occupation, a place frequently visited by the user, and the like. As an example, if a hobby of the user is golf, the plurality of predicted positions may be displayed in consideration of the fact that the user may be holding a golf club.

In addition, the information about the user may include at least one of a location of the user, a hobby of the user, and the weather. For example, the information about the image may include at least one of a location of an object when the image is generated, the weather when the image is generated, and a human recognized in the image.

In operation S340, the device 100 receives an input for selecting one of the plurality of predicted positions displayed in operation S330. The selection received by the device 100 may be input via at least one of a mouse, a keyboard, a touch pad, a speech recognition module including a microphone, a visual command (i.e. hands) recognition module including a camera, and the like.

In operation S350, the device 100 rearranges a location displayed in operation S320 based on the selection input received in operation S340. In some examples, the device 100 may display the predetermined symbol 130, and/or the visual symbol 140 on the image to correspond to the selection input received in operation S340.

Figure 4:
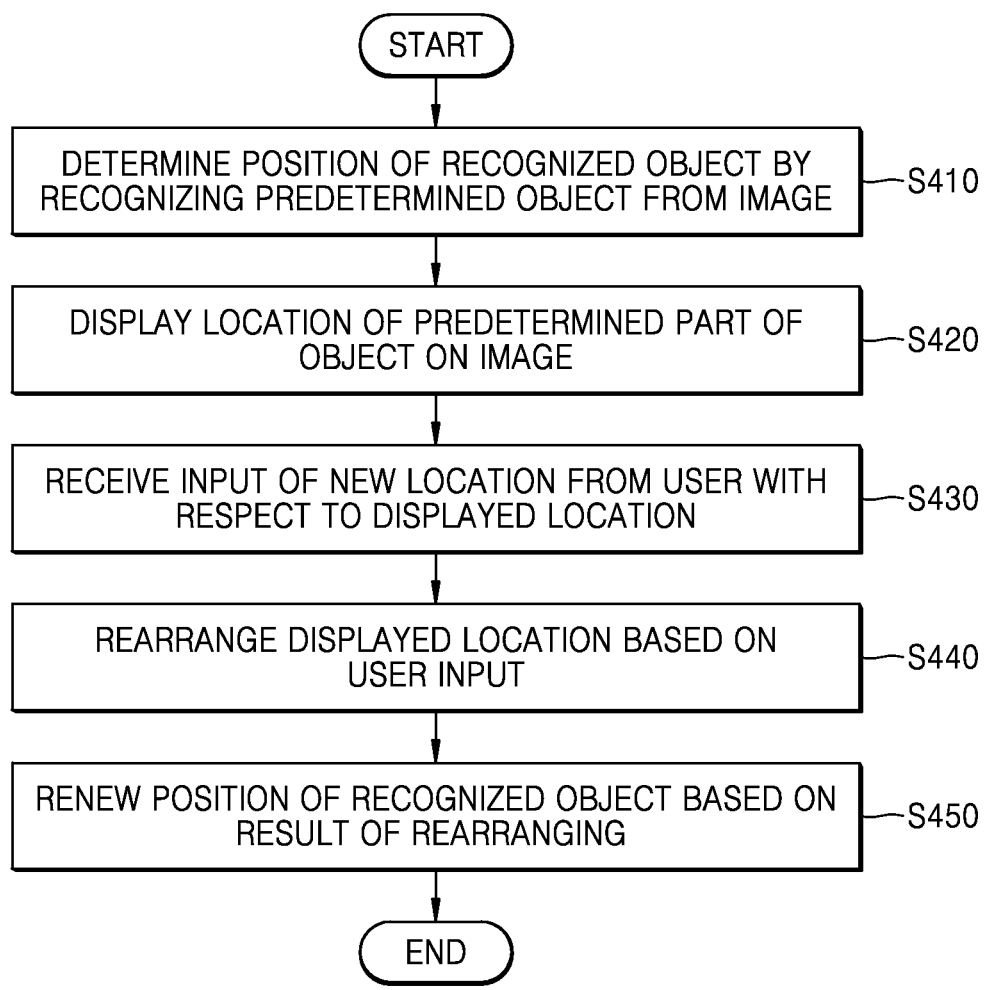
FIG. 4 is a flowchart illustrating a method of renewing a position of a recognized object by rearranging a location of the displayed object on an image based on a user input, according to an exemplary embodiment.

FIG. 4 is a flowchart illustrating a method of renewing a position of a recognized object by rearranging a location displayed on an image based on a user input, according to an exemplary embodiment.

In this example, because operations S410, S420, and S450 respectively correspond to the operations S210, S220, and S240 of FIG. 2, their detailed descriptions are omitted for brevity of explanation.

Referring to FIG. 4, in operation S430 device 100 receives a user input of a new location with respect to the location displayed in operation S420.

For example, using the device 100, a user may drag one of the symbols 130 displayed in operation S420 to move the symbol 130 to another place. The visual symbol 140 as well as the predetermined symbol 130 may be rearranged based on the user input. For example, the user may input a drag and drop command via a mouse, touch pad, keyboard, and the like.

In operation S440, the device 100 rearranges the location displayed in operation S420 based on the user input received in operation S430.

Alternatively, in operation S440, the device 100 may rearrange a location of the symbol displayed in operation S420 based on the user input received in operation S430. The symbol may include at least one of the predetermined symbol 130, and the visual symbol 140 such as a line.

Figure 5:
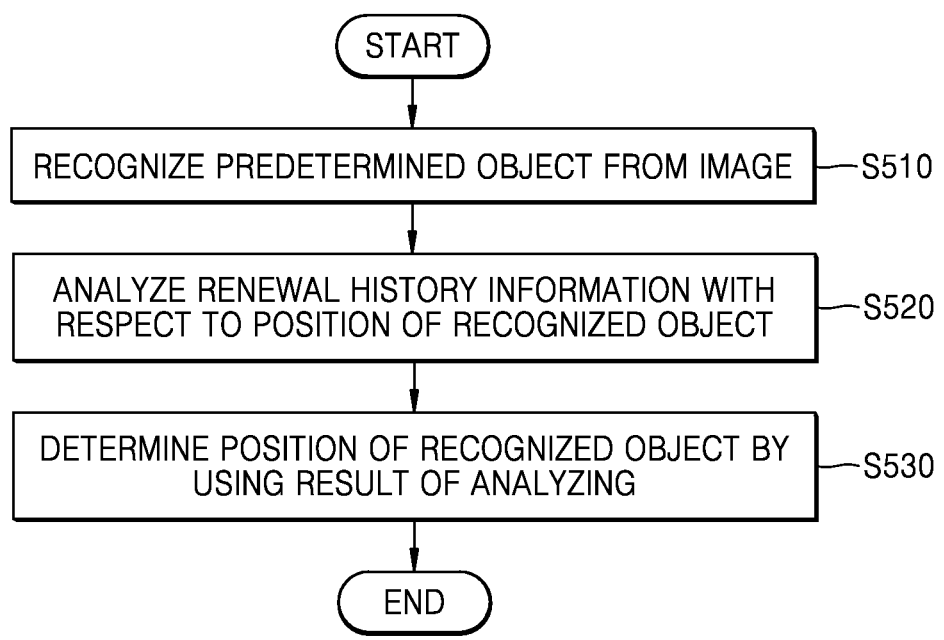
FIG. 5 is a flowchart illustrating a method of analyzing history information with respect to a position of an object and determining a position of the recognized object based on the analyzed history, according to an exemplary embodiment.

FIG. 5 is a flowchart illustrating a method of analyzing history information with respect to a position of an object and determining a position of a recognized object, according to an exemplary embodiment.

Referring to FIG. 5, device 100 recognizes a predetermined object from an image, in operation S510. For example, the device 100 may determine whether there is the predetermined object in the image. Alternatively, the device 100 may determine whether there is a figure of the predetermined object in the image.

In an example in which the predetermined object is a human, the device 100 may determine whether there is an object of a human figure in the image. When the device 100 determines that there is an object of the human figure in the image, the device 100 may recognize the object as the human figure. Alternatively, when the device 100 determines that there is the object of the human figure in the image, the device 100 may distinguish the object determined to be the human figure from another object in the image.

In operation S520, the device 100 analyzes renewal history information with respect to a position of the object recognized in operation S510. For example, the device 100 may store the renewal history information with respect to the position of the recognized object. Alternatively, the device 100 may store a history of additional renewing of the position of the recognized object. Accordingly, the device 100 may analyze the stored renewal history information.

In operation S530, the device 100 determines the position of the object recognized in operation S510 using the analysis of operation S520. For example, the device 100 may use the analysis of operation S520 when determining the position of the recognized figure.

According to an exemplary embodiment, an example in which a predetermined symbol 130 is rearranged based on a user input is described. The device 100 may determine whether there is a human figure in the image. The device 100 may further determine a position of the human figure when the device 100 determines that the human figure is present in the image. The device 100 may display the predetermined symbol 130 on the image to correspond to the determined position.

In this example, the device 100 may receive from the user an input of a signal requesting or otherwise instructing the device 100 to change a location of the predetermined symbol 130. The device 100 may rearrange the location of the predetermined symbol 130 based on the signal input received from the user. Also, the device 100 may renew the position of the recognized object based on the rearranged location of the predetermined symbol 130.

In this example, the device 100 may store information with respect to the renewed position. The information with respect to the renewal may be referred to as renewal history information. When the device 100 determines that there is a human figure in the image, the device 100 may use the stored renewal history information to determine a position of the human figure. Thus, when determining a position of a similar figure as a previously renewed figure, the device 100 may determine the position of the figure as a position after the previous renewal.

Figure 6:
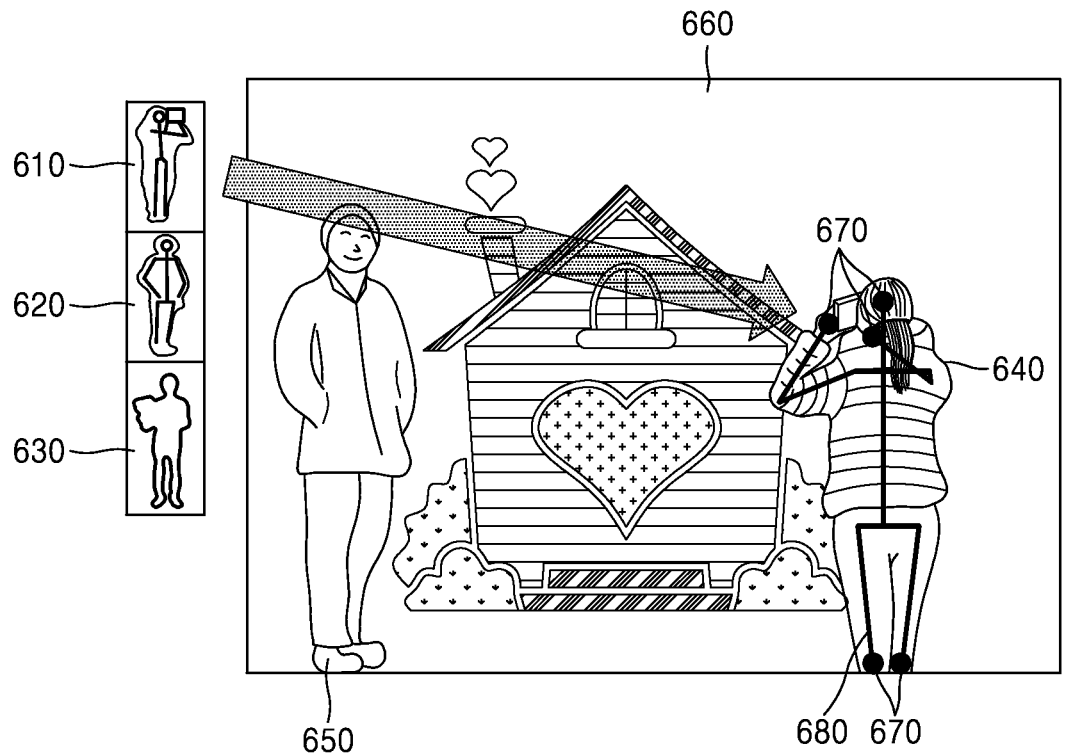
FIG. 6 is a diagram illustrating a method of determining a position of an object recognized from an image and editing the determined position, according to an exemplary embodiment.

FIG. 6 is a diagram illustrating a method of determining a position of an object recognized from an image and editing the determined position, according to an exemplary embodiment.

Referring to FIG. 6, device 100 may determine whether there is a human figure in an image 660. When the device 100 determines that there is the human FIG. 640, the device 100 may determine a position of the human FIG. 640 and display the position of the human FIG. 640 and also display a predetermined symbol 670, and/or a visual symbol 680 such as a line. The device 100 may renew the displayed position based on a user input. For example, the device 100 may receive the user input for adjusting a location of the predetermined symbol 670, and/or the visual symbol 680.

In this example, the device 100 displays various predicted positions 610, 620, and 630. When an input for selecting one of the predicted positions 610, 620, and 630 displayed by the device 100 is received, the device 100 may display the position of the human FIG. 640 as a position corresponding to the received input using the predetermined symbol 670, and/or the visual symbol 680.

Also, the device 100 may fail at recognizing a human FIG. 650 even when there is the human figure in the image. Accordingly, device 100 may further receive a user input enabling the device 100 to recognize that the human FIG. 650 failed to be recognized.

Figure 7:
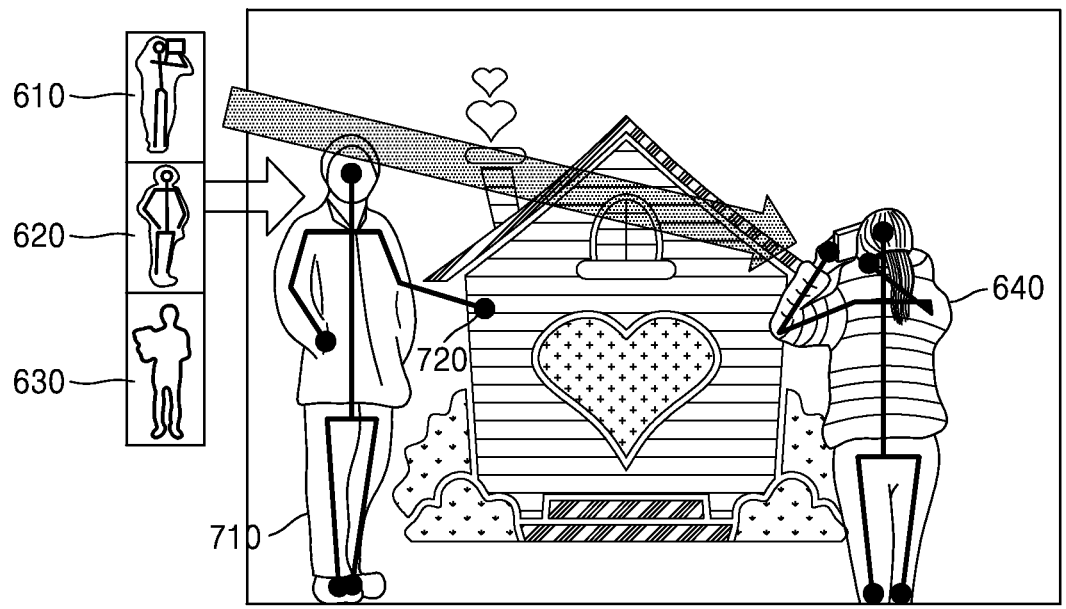
FIG. 7 is a diagram illustrating a method of determining a position of an object recognized from an image and editing the determined position, according to another exemplary embodiment.

FIG. 7 is a diagram illustrating a method of determining a position of an object recognized from an image and editing the determined position, according to another exemplary embodiment.

The device 100 may determine whether there is a human figure in an image. When the device 100 determines that there is the human figure in the image, the device 100 may determine a position of the human figure. However, the device 100 may make a mistake in determining the position of the human figure.

FIG. 7, is an example of a case in which the device 100 ill-determines the position of a human FIG. 710 (corresponding to 650 in FIG. 6) and displays a predetermined symbol 720 incorrectly. That is, the device 100 ill-determines the position of a part of the human FIG. 710 and displays the predetermined symbol 720 corresponding to the part in a wrong location. The device 100 may receive a user input that instructs or otherwise causes the predetermined symbol 720 displayed in the wrong location to be moved to a proper location. For example, the device 100 may receive a dragging input from a user to move the predetermined symbol 720 located in the wrong location to the proper location. Alternatively, when an input of selecting one of the plurality of predicted positions 610, 620, and 630 displayed by the device 100 is received, the device 100 may move the predetermined symbol 720 displayed in the wrong location to the proper location based on the applied input.

As another example, the device 100 may determine a position of a recognized object 710 by a user dragging position 620 of the plurality of predicted positions 610, 620, and 630 causing the device to move the incorrectly placed part of the recognized object 710 to a correct location.

Figure 8:
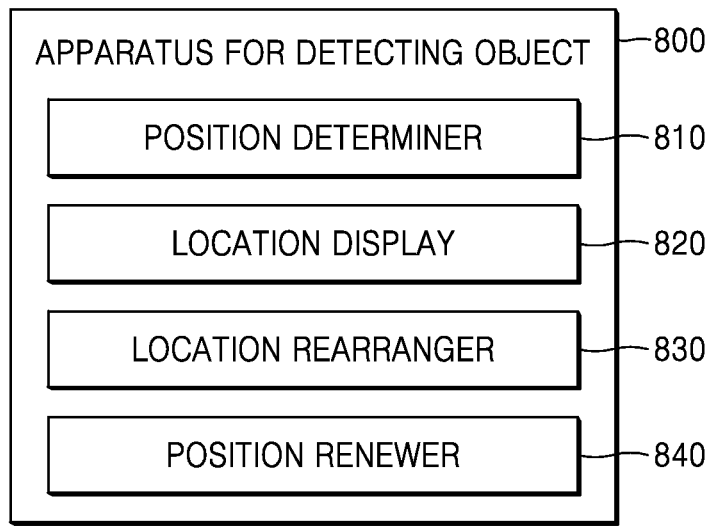
FIG. 8 is a block diagram illustrating an apparatus for detecting an object according to an exemplary embodiment.
Figure 9:
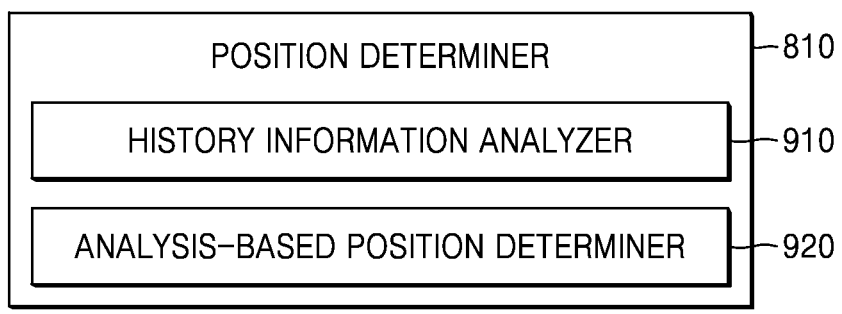
FIG. 9 is a block diagram illustrating a position determiner that determines a position of an object detected in an image, according to an exemplary embodiment.
Figure 10:
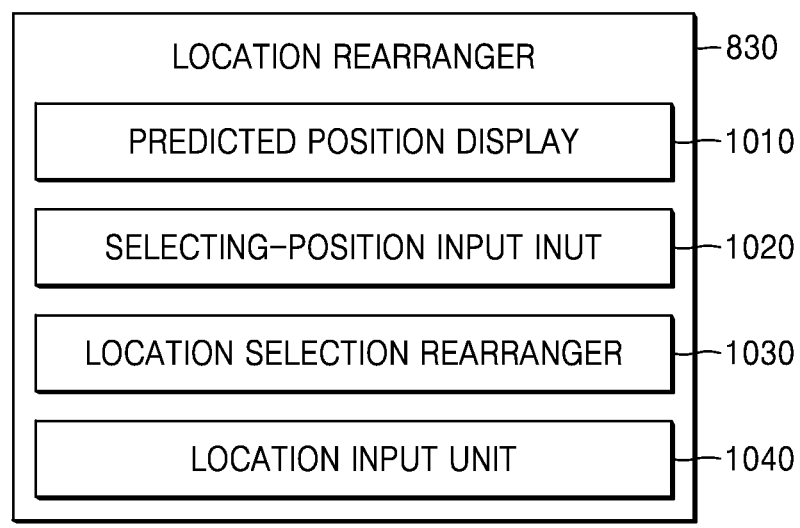
FIG. 10 is a block diagram illustrating a location rearranger that rearranges a location displayed with respect to a position of an object detected from an image, according to an exemplary embodiment.

FIGS. 8 through 10 are diagrams illustrating apparatuses for detecting an object, according to exemplary embodiments. The apparatuses for detecting the object may obtain information from an image and perform editing with respect to the image. For example, apparatuses may perform any of and all of the above described exemplary embodiments of the methods of detecting the object.

FIG. 8 is a block diagram illustrating an apparatus for detecting an object 800 according to an exemplary embodiment.

As illustrated in FIG. 8, the apparatus for detecting the object 800 includes a position determiner 810, a location display 820, a location rearranger 830, and a position renewer 840. However, the apparatus for detecting the object 800 may include more or less components than those illustrated in FIG. 8.

The position determiner 810 may recognize a predetermined object from an image and determine a position of the recognized object.

The location display 820 may display a location of a predetermined part of the object on the image.

The location rearranger 830 may rearrange the location displayed by the location displaying unit 820 based on a user input.

The position renewer 840 may renew the position of the recognized object based on the rearrangement by the location rearranger 830. Also, in some examples, in the case of a video, the position renewer 840 may renew a position of a recognized object based on a user input. For example, the position renewer 840 may perform the same operation for the video as for the still picture. The position renewer 840 may partially store the video that is being played, while a position of a selected image is being rearranged, and may play the stored video by reflecting a renewed position.

FIG. 9 is a block diagram illustrating an example of the position determiner shown in FIG. 8 that determines a position of an object detected in an image, according to an exemplary embodiment.

Referring to FIG. 9, the position determiner corresponds to the position determiner 810 of FIG. 8, and includes a history information analyzer 910 and an analysis-based position determiner 920.

The history information analyzer 910 may analyze renewal history information with respect to the position of the recognized object.

The analysis-based position determiner 920 may determine the position of the object using the analysis of the history information analyzer 910.

FIG. 10 is a block diagram illustrating an example of the location rearranger shown in FIG. 8 that rearranges a location displayed with respect to a position of an object detected from an image, according to an exemplary embodiment.

Referring to FIG. 10, the location rearranger corresponds to the location rearranger 830 and includes a predicted position display 1010, a selecting-position input unit 1020, a location selection rearranger 1030, and a location input unit 1040.

The predicted position display 1010 may display a plurality of predicted positions.

The selecting-position input unit 1020 may receive a user input of a user selecting one of the plurality of predicted positions displayed by the predicted position display 1010.

The location selection rearranger 1030 may rearrange the location displayed by the location display 820 based on the selection input received by the selecting-position input unit 1020.

The location input unit 1040 may receive a user input requesting a new location of the image with respect to the location displayed by the location display 820.

Although not illustrated therein, the apparatus for detecting an object 800 may further include a controller that is configured to perform any of the functions set forth in the methods of FIGS. 3-7, and the apparatuses set forth in FIGS. 8-10.

The method and the apparatus for an object according to the one or more exemplary embodiments may be recorded on or otherwise stored on a computer-readable recording medium and may be implemented through a computer for executing instructions corresponding to the method.

Examples of the computer-readable recording medium include read-only memories (ROMs), random-access memories (RAMs), CD-ROMs, magnetic tapes, floppy disks, and optical data storage devices.

In addition, one or more exemplary embodiments may also be implemented through computer readable code/instructions in/on a medium, for example, a computer readable medium, to control at least one processing element to implement any of the above described exemplary embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.), optical recording media (e.g., CD-ROMs, or DVDs), transmission media such as Internet transmission media, and the like. Thus, the medium may be such a defined and measurable structure including or carrying a symbol or information, such as a device carrying a bitstream according to one or more exemplary embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

Computers that may read the recording medium having embodied thereon an application, which is a program for implementing the method and the apparatus for detecting the object according to the present exemplary embodiments, may include not only a desk top computer or a notebook computer, but also mobile terminals, such as a smart phone, a tablet PC, a personal digital assistant (PDA), and a mobile communication terminal. In addition to this, apparatuses capable of computing may be included herein.

Unless the context dictates otherwise, the word "comprise" or variations such as "comprises" or "comprising" is understood to mean "includes, but is not limited to" such that other elements that are not explicitly mentioned may also be included therein.

It should be understood that the exemplary embodiments described herein should be considered in a descriptive sense only and not for purposes of limitation. Descriptions of features and aspects within each exemplary embodiment should typically be considered as available for other similar features or aspects in other embodiments.

While one or more exemplary embodiments of the present invention have been described with reference to the figures, it will be understood by those of ordinary skill in the art that various changes in form and details may be made therein without departing from the spirit and scope of the present invention as defined by the following claims.

What is claimed is:

1. A method of detecting an object, the method comprising:
recognizing a predetermined object from at least one of an image and a video and determining a position of the recognized object;
displaying on the image or the video a location of a predetermined part of the recognized object;
rearranging the displayed location of the predetermined part of the recognized object based on an input signal; and
renewing the position of the recognized object based on a result of the rearranging of the displayed location of the predetermined part of the recognized object
wherein the rearranging of the displayed location of the predetermined part of the recognized object based on the input signal comprises:
determining a plurality of predicted positions of the object; and
rearranging the displayed location of the recognized object based on a received input selecting one of the plurality of predicted positions.

2. The method of claim 1, wherein the predetermined object comprises a human, and the predetermined part of the recognized object comprises at least one of a head, a hand, a foot, a wrist, an ankle, a knee, and a shoulder.

3. The method of claim 1, wherein the determining of the position of the recognized object comprises:
analyzing renewal history information with respect to the position of the recognized object; and
determining the position of the recognized object using a result of the analyzing.

4. The method of claim 1, wherein the determining the plurality of the predicted positions is performed based on information about a user or based on information about at least one of the image and the video of the predetermined object.

5. The method of claim 4, wherein the information about the user comprises at least one of a current location of the user, a hobby of the user, and the current weather.

6. The method of claim 4, wherein the information about at least one of the image and the video comprises at least one of a location of an object when the image or the video is generated, the weather when the image or the video is generated, and a human that is recognized in the image or the video.

7. The method of claim 1, wherein the displaying of the location comprises displaying the location of the predetermined part as a certain figure.

8. The method of claim 1, wherein the rearranging of the displayed location is based on the input signal which further comprises a new location with respect to the displayed location of the predetermined part of the recognized object.

9. The method of claim 1, further comprising renewing the position of the object based on the rearranging.

10. An apparatus for detecting an object, the apparatus comprising:
a processor configured to:
recognize a predetermined object from at least one of an image and a video and determine a position of the recognized object;
locate a location of a predetermined part of the recognized object on the image or the video;
determine a plurality of predicted positions of the recognized object;
rearrange the location of the predetermined part of the recognized object based on a received input selecting one of the plurality of predicted positions; and
renew the position of the recognized object based on the rearranging of the location of the predetermined part of the recognized object; and
a display configured to display the recognized object whose position is renewed.

11. The apparatus of claim 10, wherein the predetermined object comprises a human, and the predetermined part comprises at least one of a head, a hand, a foot, a wrist, an ankle, a knee, and a shoulder.

12. The apparatus of claim 10, wherein the processor is configured to:
analyze renewal history information with respect to the position of the recognized object; and
determine the position of the recognized object using the analysis.

13. The apparatus of claim 10, wherein the display is configured to display the predicted positions based on information about a user or information about at least one of the image and the video.

14. The apparatus of claim 13, wherein the information about the user comprises at least one of a current location of the user, a hobby of the user, and the current weather.

15. The apparatus of claim 13, wherein the information about at least one of the image and the video comprises at least one of a location of an object when the image or the video is generated, the weather when the image or the video is generated, and a human recognized in the image or the video.

16. The apparatus of claim 10, wherein the display is configured to display the location of the predetermined part as a certain figure.

17. The apparatus of claim 10, wherein the processor is configured to receive an input of a new location with respect to the location of the predetermined part of the recognized object.

18. A non-transitory computer-readable medium having recorded thereon a computer program that is executable by a computer to perform the method of claim 1.

* * * * *